UNITED STATES PATENT OFFICE.

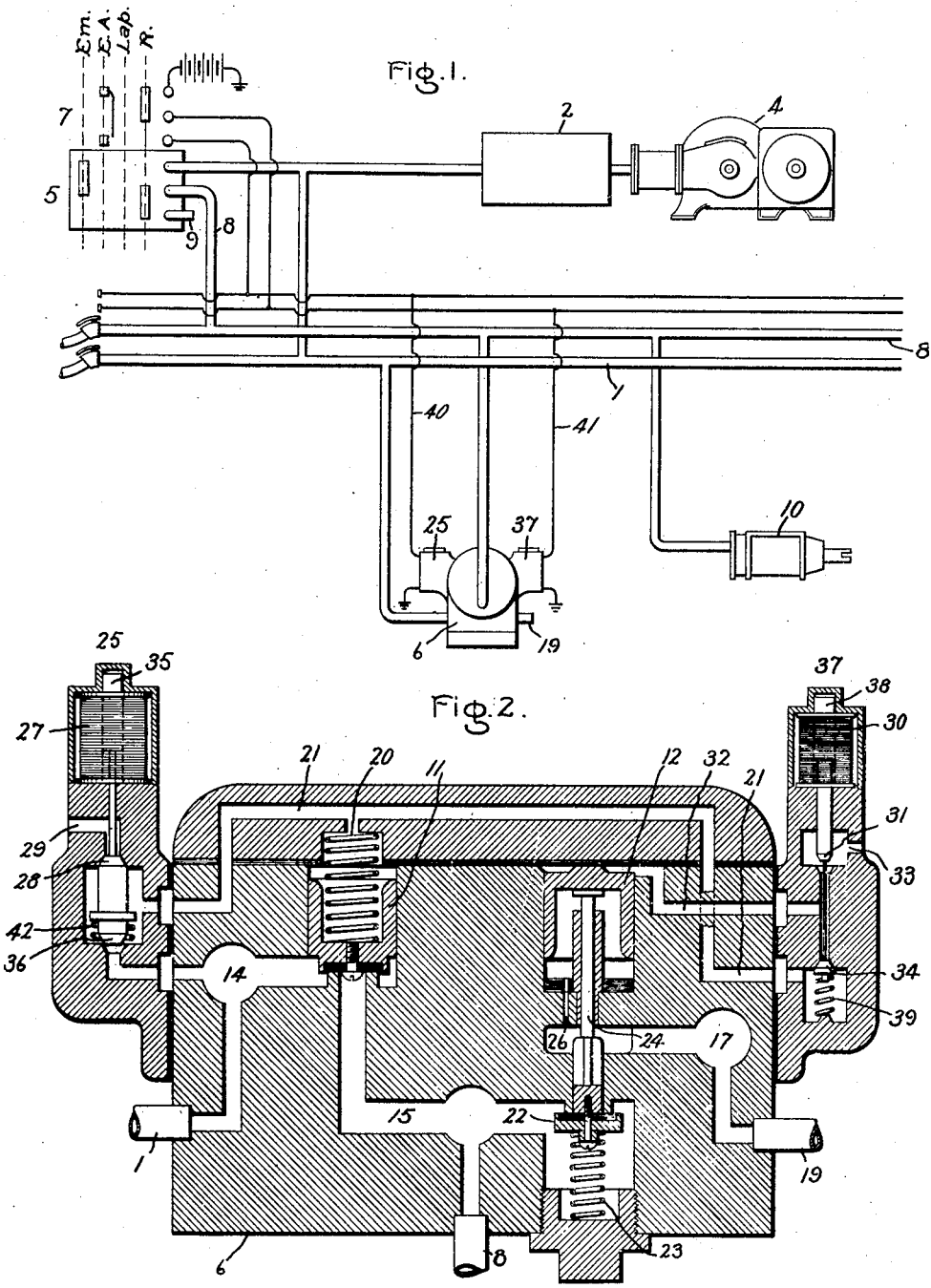

GEORGE MACLOSKIE, OF ERIE, PENNSYLVANIA, ASSIGNOR TO GENERAL ELECTRIC COMPANY, A CORPORATION OF NEW YORK.

AIR-BRAKE SYSTEM.

1,339,962.      Specification of Letters Patent.      Patented May 11, 1920.

Application filed May 7, 1919. Serial No. 295,438.

*To all whom it may concern:*

Be it known that I, GEORGE MACLOSKIE, a citizen of the United States, residing at Erie, in the county of Erie, State of Pennsylvania, have invented certain new and useful Improvements in Air-Brake Systems, of which the following is a specification.

This invention relates to air brake systems and particularly to electropneumatic brake systems.

In electropneumatic brake systems it is the practice to use a magnet valve which, when operated, establishes a connection between a source of pressure and the brake cylinder to apply the brakes and a magnet valve which, when operated, establishes a connection between the brake cylinder and atmosphere to release the brakes. Circuits for operating these magnet valves are usually controlled in different positions of a motorman's valve so that only one of these magnet valves will be energized at any instant. It may happen, however, that both magnet valves are operated at the same time due to a short circuit or some other defect in the wiring and thereby the source of air pressure is connected direct to atmosphere through the brake cylinder and magnet valves which is a condition not desired.

The object of my invention is to provide an arrangement such that if said magnet valves are simultaneously operated, both of said connections to the brake cylinder are not established.

In accordance with my invention I provide in an air brake system a pneumatic interlocking arrangement which prevents the establishment of the connection to release the brakes when the connection for applying the brakes is established.

In the preferred form of my pneumatic interlocking arrangement I provide an application valve which is held in its closed position by air pressure to disconnect the source of air pressure from the brake cylinder to prevent the brakes being applied, a release valve which is adapted to be operated by air pressure to establish a connection between the brake cylinder and atmosphere to release the brakes, a passage connected to a source of pressure which supplies air pressure to the application valve to hold said valve closed, and which is adapted to serve as the passage from which air pressure is obtained to operate said release valve, and means for disconnecting said passage from the source of pressure and connecting it to atmosphere to exhaust the air from said passage to open said application valve to apply the brakes. It will be observed that when the application valve is operated to apply the brakes, the passage is connected to atmosphere and, consequently, there is no air pressure in the passage to operate the release valve.

For a further understanding of my invention, reference may be had to the accompanying drawing wherein Figure 1 illustrates diagrammatically an electropneumatic air brake system involving my invention, and Fig. 2 is a diagram of a valve device embodying my invention.

I have shown a straight air brake system in Fig. 1 in order to simplify the disclosure, but it is to be understood that my invention is not limited to this particular system.

The system shown in Fig. 1 includes a reservoir pipe 1 supplied by a main reservoir 2, a pump 4 being used to maintain the pressure in the main reservoir 2. The reservoir pipe 1 supplies air to the motorman's valve 5 and to a valve device 6 which will be later described. The controller 7 of the electrical portion of the system is preferably attached to the motorman's valve and operates therewith. I have shown the motorman's valve 5 and the controller 7 developed in a plane surface.

The motorman's valve 5, as shown, has four operating positions and reading from right to left, they are, respectively, release, lap, electric application and emergency. In the release position the brake pipe 8 is connected to the exhaust pipe 9 through a port in the motorman's valve. In the lap and electric application positions, the exhaust pipe and the brake pipe are blanked. In the emergency position the reservoir pipe 1 is connected to the train pipe 8 and air is supplied to the brake cylinder 10. The operation of the straight air brake system above outlined is well known in the art and, therefore, a detailed description thereof will not be given, as it forms no part of this invention.

To the pneumatic system is added an electric system which consists in part of the valve device 6, which, as diagrammatically shown in Fig. 2, has an application valve 11 controlling the connection between a passage 14 which leads to the reservoir pipe 1 and a passage 15 which leads to the brake pipe 8, and a release valve 22 which controls a connection between the passage 15 and a passage 17 which is connected to the exhaust pipe 19. One side of the application valve 11 is subject to the pressure of a spring 20 and also to the pressure in the passage 21. A portion of the area of the other side of the valve 11 is connected to the passage 14 and, therefore, is subject to the reservoir pressure. The release valve 22 is subject on one side to the pressure of a spring 23 and the pressure in the brake cylinder passage 15. 12 designates a piston which is connected to the opposite side of the valve 22 by means of a rod 24. One side of the piston 12 is connected to the exhaust passage 17 through a small passage 26, and the opposite side of the piston 12 is connected to passage 32. 25 designates an application magnet valve which consists of a coil 27, which is connected to conductor 40, and a plunger 35 which is connected to a double beat valve comprising a valve 28 for venting air from the top of application valve 11 through passage 21 to the exhaust passage 29, and a valve 36 for controlling the communication between the supply passage 14 and passage 21. A spring 42 holds the valves 28 and 36 in the position shown in the drawing, when the coil 27 is deënergized. 37 designates a release magnet valve which consists of a coil 30 which is connected to conductor 41 and a plunger 38 which is connected to a double beat valve comprising a valve 31 for venting air from the top of piston 12 through passage 32 to the exhaust passage 33, and a valve 34 controlling communication between passage 32 and passage 21. A spring 39 holds the valves 31 and 34 in the positions shown when the coil 30 is deënergized.

The operation of the electric system is as follows: With the controller 7 in lap position both of the coils 27 and 30 are deënergized and, therefore, are in the positions shown in Fig. 2. Air under pressure flows through passage 14 and valve 36 to passage 21 so that the air pressure is applied to both sides of the valve 11 and, therefore, the valve 11 is maintained on its seat as shown in Fig. 2, consequently the communication between the supply passage 14 and the brake passage 15 is closed. The passage 32 is connected to exhaust passage 33 through valve 31 so that the valve piston 12 is maintained in the position shown in Fig. 2 by the spring 23 and also by the air pressure in the brake cylinder if the brakes are applied at the time.

If the brakes are not applied, and an electric application of the brakes is desired, the controller 7 and motorman's valve 5 are moved to the electric application position whereupon a circuit for coil 27 of the application magnet valve 25 is completed through conductor 40. Valve 36 is thereby operated to close the connection between supply passage 14 and passage 21, and valve 28 is operated to connect the passage 21 to the exhaust passage 29 to vent air from the passage 21. The air pressure acting on the lower exposed area of valve 11 then opens the valve so that air is supplied from the main reservoir 2, through reservoir pipe 1, passage 14, brake passage 15, brake pipe 8 to the brake cylinder 10, to apply the brakes. After an electric application of the brakes, they may be released by moving the controller 7 and the motorman's valve 5 to the release position, at which time a circuit is closed for the coil 30 of the release magnet valve 37 through conductor 41. The circuit of coil 27 of application magnet valve is opened as soon as the controller 7 leaves the electric application position. When the coil 30 is energized the valve 31 is operated to close the connection between the passage 32 and the exhaust passage 33, and valve 34 is operated to establish communication between passage 21 and passage 32. Air under pressure is thereby applied to the top of valve piston 12 which is moved downward and by means of rod 24 opens the valve 22 to establish communication between the brake cylinder 10 and atmosphere through brake pipe 8, passages 15 and 17 to the exhaust pipe 19. The area on top of the piston 12 which is exposed to the air pressure is so much larger than the area of the piston 22 which is exposed to the pressure in the brake cylinder that it overcomes the pressure of spring 23. The lower side of the piston 12 is connected to the exhaust passage 17 through a passage 26 so that air will not be trapped under the lower side of this piston and thereby prevent it moving promptly to its lower position when the release magnet valve is energized.

Let us now assume that by some means, such as a short circuit between conductors 40 and 41, both of the coils 27 and 30 are energized at the same time. Valve 28 is thereby operated to vent air from the passage 21 so that the valve 11 is operated to establish communication between the supply passage 14 and the brake cylinder 10 to apply the brakes. Although the valve 34 is operated to establish communication between passage 21 and passage 32, the valve piston 12 is not moved downward to open release valve 22 because there is no air pressure in the passage 21 as it is connected to atmosphere through valve 28. The pressure in the brake cylinder 10 and the spring 23 therefore maintains the valve 22 in the position shown in Fig. 2 so that the brakes are applied but the connection between the brake cylinder and the exhaust pipe is not established. It will, therefore, be seen that I have provided an arrangement whereby the application and release valves can be operated separately but both cannot be operated at the same time.

It is, of course, apparent that many alterations may be made in the apparatus herein disclosed without departing from the spirit and scope of my invention, and, therefore, I do not wish to be limited to the specific apparatus shown, but aim to cover by the terms of the appended claims all such alterations.

What I claim as new and desire to secure by Letters Patent of the United States, is:—

1. In an air brake system, a brake cylinder, a source of air pressure, a magnet valve adapted to be operated to establish a connection between said source and brake cylinder, a second magnet valve adapted to be operated to establish a connection between said brake cylinder and exhaust, means for operating said magnet valves to establish said connections, and means for preventing the establishment of both of said connections when both of said magnet valves are operated at the same time.

2. In an air brake system, a brake cylinder, a source of air pressure, a magnet valve adapted to be operated to establish a connection between said source and brake cylinder, a second magnet valve adapted to be operated to establish a connection between said brake cylinder and exhaust, means for operating said magnet valves to establish said connections, and means for establishing only one of said connections when both of said magnet valves are operated at the same time.

3. In an air brake system, an application valve for controlling the application of the brakes, an application magnet valve for controlling the operation of said application valve, means for operating said application magnet valve to operate said application valve to apply the brakes, a release valve, a release magnet valve for controlling the operation of said release valve, means for operating said release magnet valve to operate said release valve to release the brakes, and means controlled by the operation of one of said magnet valves for preventing the operation of the valve controlled by the other one of said magnet valves.

4. In an air brake system, an application valve for controlling the application of the brakes, an application magnet valve for controlling the operation of said application valve, means for operating said application magnet valve to operate said application valve to apply the brakes, a release valve for controlling the release of the brakes, a release magnet valve for controlling the operation of said release valve, means for operating said release magnet valve to operate said release valve to release the brakes, and means controlled by the operation of said application magnet valve for preventing the operation of said release valve to release the brakes.

5. In an air brake system, a source of air pressure, an application valve controlling the application of the brakes, a passage connecting said source to said application valve to maintain same valve closed, an application magnet valve arranged to disconnect said source from said passage and to connect said passage to atmosphere to cause the operation of said application valve to apply the brakes, a release valve controlling the release of the brakes, a valve piston controlling said release valve, and a release magnet valve arranged to connect said passage to one side of said piston to apply air pressure thereto to operate the release valve to release the brakes.

6. In an air brake system, a source of air pressure, a passage connected to said source, a brake cylinder, an application valve operated by pressure in said passage to maintain said source disconnected from said brake cylinder, an application magnet valve for venting the air from said passage to cause said application valve to establish communication between said source and brake cylinder, a release valve controlling a connection between said brake cylinder and atmosphere, means adapted to be operated by air pressure to operate said release valve to establish communication between said brake cylinder and atmosphere, and a release magnet valve for establishing connection between said passage and said means to apply air pressure to said means to operate the same.

7. In combination, a source of air pressure, an application valve, a passage connecting said source to said application valve to hold said valve in its closed position, means for disconnecting said source from said passage and connecting said passage to atmosphere to operate said application valve, a release valve adapted to be operated by air pressure and means for establishing a connection between said passage and said release valve to operate said release valve.

In witness whereof I have hereunto set my hand this 5th day of May, 1919.

GEORGE MACLOSKIE.